United States Patent [19]

Levasseur et al.

[11] Patent Number: 6,155,927
[45] Date of Patent: Dec. 5, 2000

[54] ELECTRONIC COMPETITION SYSTEM AND METHOD FOR USING SAME

[76] Inventors: Jacques Levasseur, 42, route de Roissy, 95500 le Thillay, France; Gérard Benkel, 61, avenue du Petit Clamart, 92140 Clamart, France

[21] Appl. No.: 08/930,782
[22] PCT Filed: Mar. 28, 1996
[86] PCT No.: PCT/FR96/00474
§ 371 Date: Oct. 6, 1997
§ 102(e) Date: Oct. 6, 1997
[87] PCT Pub. No.: WO96/31831
PCT Pub. Date: Oct. 10, 1996

[30] Foreign Application Priority Data

Apr. 6, 1995 [FR] France .................................. 95 04116

[51] Int. Cl.[7] ............................................ A63F 09/22
[52] U.S. Cl. .................................. 463/42; 434/69
[58] Field of Search .................. 434/66–69; 463/39–43, 463/66–69

[56] References Cited

U.S. PATENT DOCUMENTS 5,714,997  2/1998  Anderson ................................ 348/39
5,865,624  2/1999  Hayashigawa .......................... 434/69
5,956,485  9/1999  Perlman ............................. 395/200.34

*Primary Examiner*—Jessica J. Harrison
*Assistant Examiner*—Sheila Clayton
*Attorney, Agent, or Firm*—Pollock, Vande Sande & Amernick

[57] ABSTRACT

The invention relates to an electronic system for contests between professional competitors and amateurs, the former moving about in an actual environment (19) and the latter moving about in the same environment in virtual reality. In its application to an automobile race on a closed circuit (19), the invention resides in the fact that, associated with each real circuit is a circuit server device (21) which stores the positions and the performance of the actual vehicles, each of which is piloted by a professional competitor. This circuit server device (21) is connected to terminal devices (28, 29, 30), each of which is associated with an amateur competitor via local server devices (22, 23, 24). Each terminal device comprises a cockpit which simulates a cockpit in an actual vehicle and comprises means to display, on its screen, the contest circuit, and to process the data from the cockpit and to compare said data to the performance of the other virtual vehicles and the actual vehicles.

11 Claims, 1 Drawing Sheet

ELECTRONIC COMPETITION SYSTEM AND METHOD FOR USING SAME

FIELD OF THE INVENTION

The invention relates to an electronic system for sporting contests or the like, real or simulated, which takes place in an actual or simulated location. It relates, more particularly, to an electronic system and to a method for applying the racing system between the pilots of vehicles, whether real or simulated, which are displaced on an actual or simulated circuit, and to a method for applying the system.

BACKGROUND OF THE INVENTION

There exist electronic control panels for simulating the piloting of vehicles, in particular motor vehicles, which control panels show the pilot by way of a screen an image of the motor vehicle moving about a circuit or a part of the circuit which is visible to the pilot, the speed and direction-changing in respect of the motor vehicle being under the control of the pilot who is provided, in front of the screen, with a steering wheel, an accelerator pedal, a brake pedal, a clutch pedal and a gear change device. These various parts for the control of a vehicle may be replaced by a control lever or handle, better known by the word "joystick", an alphanumeric keyboard, a manual device to displace a reference mark on a screen, referred to as a "mouse", etc.

These electronic control panels are used for the training of pilots of actual vehicles, or for electronic games in which the performance of the "pilot" is evaluated by marks which make it possible to determine a winner amongst the attendant competitors.

In the case of electronic control panels for games, only those competitors who are present, i.e. using the same control panel, are able to compete, which limits the interest in the game.

BRIEF DESCRIPTION OF THE INVENTION

Accordingly, an object of the present invention is to provide an electronic system to race vehicles and a method for applying said system, such that "pilots" in different locations are permitted to compete.

In a more general manner, a further object of the present invention is to provide an electronic system for sporting contests or the like between competitors or participants in different locations, and to a method for applying the system.

In addition, in the instance of a race course, the track of which corresponds to a "Formula 1 Grand Prix", which is the case at present as far as existing control panels are concerned, the duration of the game is limited to a number of laps per competitor, which is quite different from conditions on the actual race course where the competition continues for a number of hours.

A further object of the present invention is thus to provide an electronic system for sporting contests or the like, and a method for applying said system, wherein it is possible to reproduce all the conditions of actual sporting contests for each competitor.

In addition, when using existing electronic control panels, the competitors do not compete in real time with the pilots of a real sporting contest.

Accordingly, a further object of the present invention is to provide an electronic system for sporting contests or the like, and a method for applying it, wherein it is possible for "casual" or "amateur" competitors to compete in real time with "professional" competitors in the original event, in a manner so as to determine a winner from amongst the competitors under conditions which are as close as possible to the reality encountered by the professional competitors.

Finally, it is not possible, using known electronic control panels, to reproduce the sporting trials as undertaken by each of the professional competitors and, when deemed advisable, to compare to professional competitors so as to train with a view to future sports events.

Accordingly, a further object of the present invention is to provide an electronic system for sporting contests or the like, and a method for applying said system, whereby it is possible for the competitors to compare their performance to the performance of professional competitors, and to undertake training with a view to improving said performance.

Accordingly, the invention relates to an electronic system for sporting contests or the like between professional competitors who are moving about, live, in an actual environment, and amateur competitors located elsewhere and not in the actual location of the contest and moving about in the same environment in virtual reality, the actual environment comprising means to determine the position and the displacement of the professional competitors in the actual environment, characterized in that it comprises:

a server device comprising means in which are stored all the data relating to the actual competition, such as the identification of the actual surroundings and of the professional competitors in the contest, outside conditions, such as weather conditions, the state of the actual environment, the starting and finishing times of the competition, the positions of the professional competitors during the competition, at least one local server device which is connected, on the one hand, to said server device by first bidirectional communication links and, on the other hand, to at least one terminal device associated with an amateur competitor by second bidirectional communication links, said local server device comprising means for, on the one hand, receiving data from said server and for transmitting, with or without processing, to said terminal devices connected thereto and for, on the other hand, receiving data sourced from the terminal devices and transmitting, with or without processing, to said server device, and characterized, in addition, in that:

each terminal device comprises means for, on the one hand, receiving and processing the data received from the local server device to which it is connected and, on the other hand, processing the performance of the amateur competitor associated with the terminal device in the course of the contest and transmitting the corresponding data to said local server device.

The invention also relates to a method for applying the system described above, said method-comprising the following steps:

real-time evaluation of the positions of the professional competitors moving about in the actual surroundings and their performance during the contest, real-time evaluation of the positions of the amateur competitors moving about in the same surroundings in virtual reality and their performance during the contest, simultaneous starting and stopping of the contest for the professional competitors and for the amateur competitors, and comparison of the performance of the amateur competitors at the end of the contest, so as to determine a first position between the amateur competitors and a second position between the amateur competitors and the professional competitors.

Further objects and characteristic features of the present invention will become evident on reading the following description of a specific exemplified embodiment of the invention, which is described with reference to the attached drawing in

BRIEF DESCRIPTION OF THE INVENTION

The single FIGURE is a functional diagram of the system according to the present invention.

DETAILED DESCRIPTION OF THE INVENTION

Figure 1:
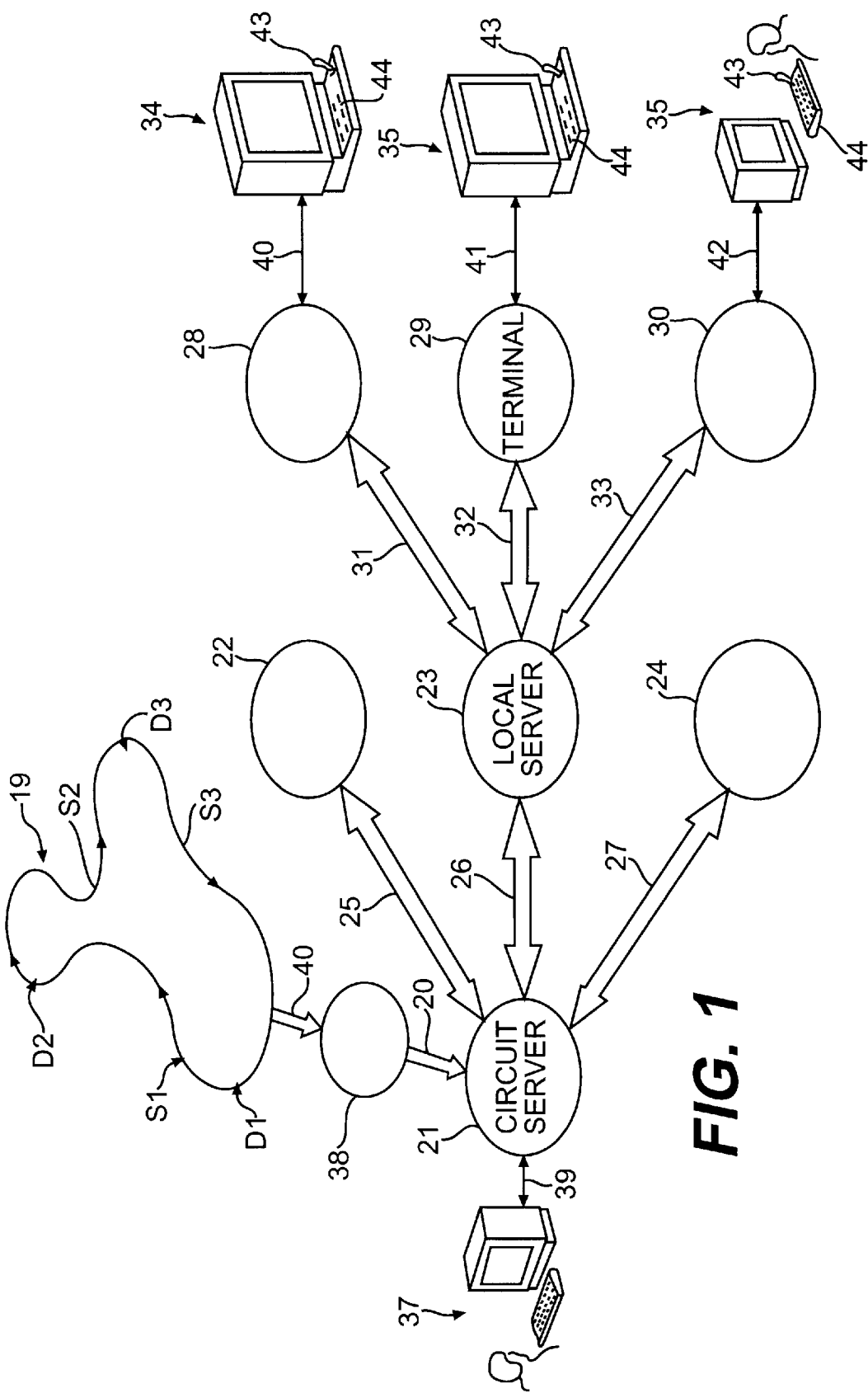

An electronic system for a contest between professional participants or competitors moving about in an actual environment and amateur competitors moving about in the same environment in virtual reality will be described within the framework of motor vehicles travelling on land and, in particular, in a "Formula 1" type motorcar race. Yet it is clear that the system may be applied to any type of vehicle: boats, aircraft, motorcycles, etc., and to any type of circuit of the kind comprising looped tracks to be covered a predetermined number of times, or of the rally-type.

The system according to the invention is also applicable to any type of contest, be it sports-orientated or not, and involving people or animals.

The electronic system according to the invention comprises a circuit server device 21 which receives, via a computer 38 and unidirectional communication links 20 and 40, data regarding the position or travel of the vehicles which are piloted by professional competitors and circulate about a circuit 19. This circuit server device 21 is connected to local server devices 22, 23 and 24 via bidirectional communication links 25, 26 and 27, respectively. Each local server device 22, 23 or 24 is connected to terminal devices 28, 29 and 30 via bidirectional communication links 31, 32 and 33, respectively. Each terminal device 28, 29 or 30 is operated by a pilot or by an amateur competitor in the race and is generally illustrated at 34, 35 and 36, reference number 36 depicting an operator in front of a computer comprising a screen, a keyboard 44 and a cockpit joystick 43. The bidirectional arrows 40, 41 and 42 indicate the connections with the system according to the invention.

The circuit 19 may be any "Formula 1" circuit participating in the world championship for motorcar racing, or any other circuit.

In order to establish the position of the vehicles on this circuit, the latter is equipped, for example, with three sensors D1, D2 and D3 which detect the travel of the vehicles and divide the circuit into three sectors S1, S2 and S3. These sensors D1, D2 and D3 are provided to detect the travel of each vehicle and to identify it, for example by means of a code which is assigned to each vehicle and which is continuously emitted by said vehicle. This information relating to the travel of the vehicle and the identification of the vehicles is processed, either by the dedicated computer 38 which is assigned to the circuit and forms part of the equipment of the circuit, or by the circuit server device 21 which forms a part of the electronic racing system according to the invention. An operator is shown in front of a computer generally indicated at 37 comprising a screen and a keyboard, the bidirectional arrow 39 indicating the connections.

It is possible for the computer 38 and/or the circuit server device 21 to bring into operation software which determines, at any moment, the position of the vehicles in each sector S1, S2 and S3, from the moment each vehicle travels past or over each sensor D1, D2 and D3 and according to an average speed calculated on that sector during previous laps. These instantaneous positions are transmitted by the circuit server device 21 for example to the terminal devices 28, 29 and 30 via the communication link 26, of the local server device 23 and the communication links 31, 32 and 33.

The terminal devices 28, 29 and 30 are provided with software which permits displaying on their screens the loop of the circuit and to position the racing vehicles, whether real or virtually real, on the displayed circuit. This display may be provided in different ways, and one possibility is to allow the landscape surrounding the circuit to flow past in the manner as seen by the pilot of the vehicle, whether real or virtually real. This type of display is currently used in the control panels of electronic games or in simulation systems used to instruct aircraft or helicopter pilots, etc.

Each terminal device 28, 29 or 30 has a sufficiently large storage capacity and will be sufficiently quick-acting to be able to provide, not only the display of a "Formula 1" circuit, but also numerous different circuits, for example all those involved in the "Formula 1" world driving championships. If the storage capacity is, however, insufficient, it is possible to use discs, cartridges or compact discs, for example one for each circuit, the content of which is stored in the permanent memory at the right moment.

Each terminal device 28, 29 or 30 is provided with a piloting control panel which comprises, for example, a steering wheel, an accelerator pedal, a brake pedal, a clutch pedal and a gear change device. It is possible for these various components of the piloting control panel to be replaced by a control handle (joystick) 43 connected to control buttons on keyboard 44 by means of which it is possible to carry out the other functions of changing direction and braking.

The piloting control panel 35 is connected to the terminal device by an electric cable 41 and the electric signals transmitted via the cable are analysed by an appropriate logic, of the kind used in a control panel for electronic games, to present to the local pilot his position on the circuit as seen from the cockpit of an actual racing car, together with the corresponding sensations, in particular the rate at which the landscape streams past, depending on the position of the accelerator pedal or of the brake pedal.

Each terminal device uses other logics to calculate, store and display the speed of the virtual vehicle piloted via the control panel, the length of the current circuit lap, the length of the previous laps and the length since the time of the start of the race, etc. It also uses other logics to process the data which is received from the circuit server device 21 and from the local server device 23, and that data which is, in turn, to be transmitted to the circuit server device and to the local server device.

Tables I, II, II and IV show the flow of data which circulates between the different parts of the system described with regard to FIG. 1, and the action taken, as far as the data is concerned, by the parties involved, being the operator at 37 of the circuit server device 21 and the pilots at 34, 35, 36 of the virtual vehicles.

Table I presents in diagrammatic form the contents of the following three Tables II, III and IV.

Table II is restricted to depicting the flow of data relating to the initializing of the system, in particular the terminal devices 28, 29 and 30, prior to the start of the race.

Table III is restricted to depicting the flow of data regarding the race itself.

Table IV is restricted to depicting the flow of data regarding the analysis of the results of the race, i.e. providing the respective positions of the competitors.

In Tables II, III and IV, identical reference numbers are used in respect of the same parts as described in FIG. 1. Capital letters A to L, which are marked in the upper right-hand corner of each rectangle associated with the circuit server device, the local server device and the terminal device, are intended simultaneously to indicate the reference of the corresponding rectangle, the chronological order of the operation involved and the extent of processing carried out by the respective device. The numbers 1 to 10 marked in circles indicate the sequence of the operations to transmit the data between the different rectangles A to L.

Thus, in Table II, the first operation A involves the operator 37 entering the following data into the circuit server device 21:

the initial weather conditions,
the identification of the actual circuit,
the identification of the actual vehicles competing,
the names of the pilots associated with the actual vehicles.

The circuit server device 21 then carries out operation 1 which involves:

transmitting the data from A to B to transmit the data to the local server devices 22, 23 and 24.

TABLE I

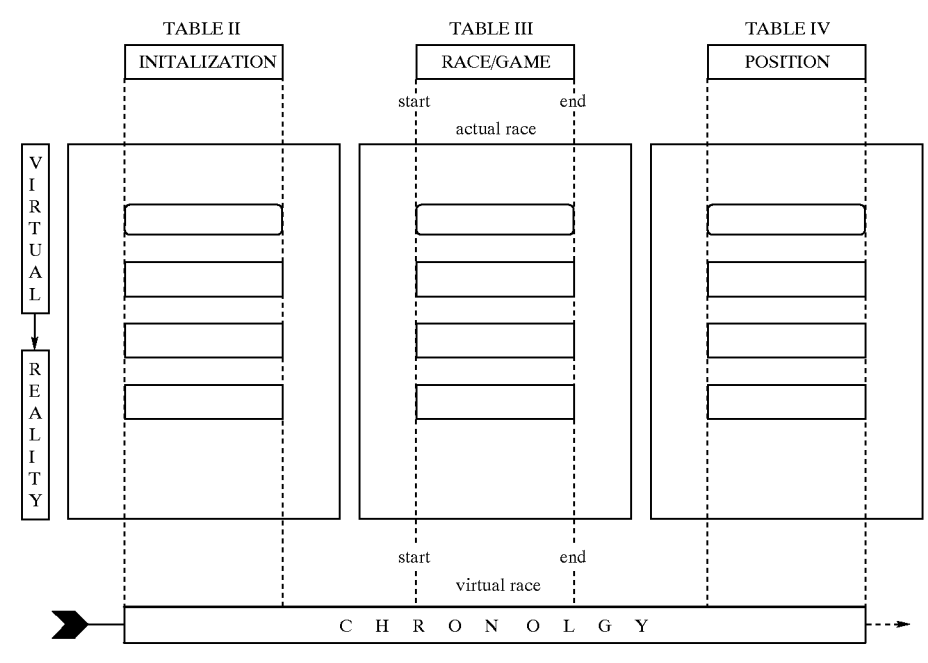

TABLE II

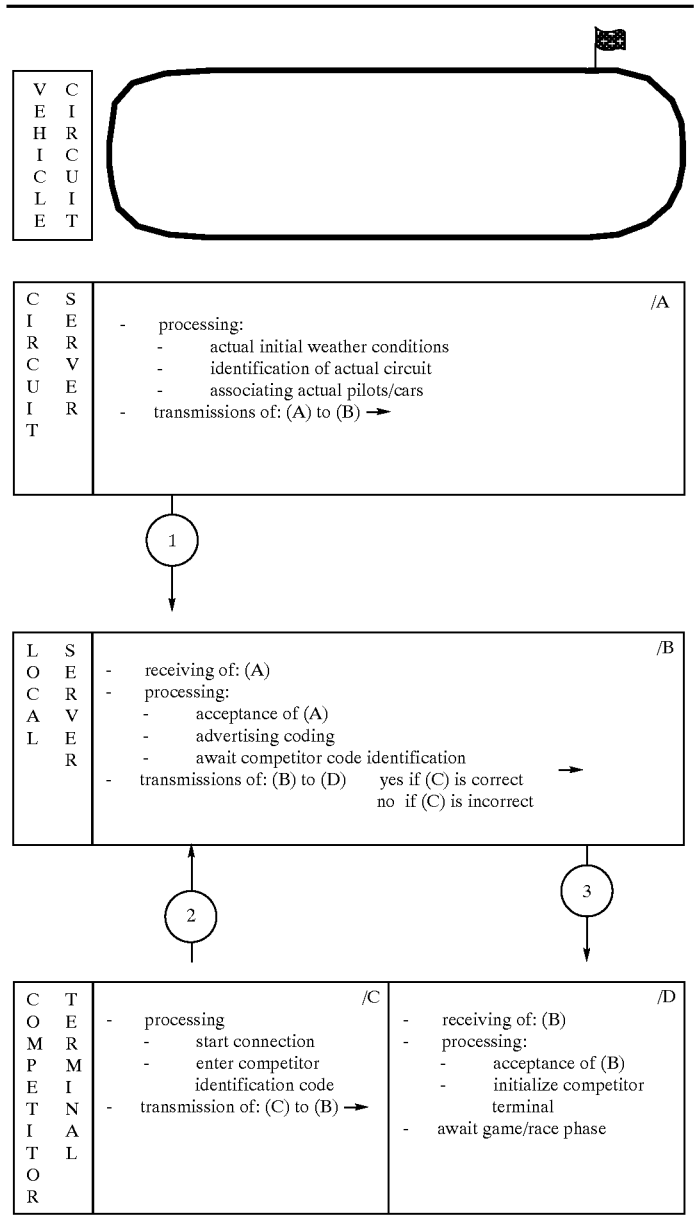

| VEHICLE CIRCUIT | | |
|---|---|---|

| CIRCUIT SERVER | - processing:<br>    - actual initial weather conditions<br>    - identification of actual circuit<br>    - associating actual pilots/cars<br>- transmissions of: (A) to (B) → | /A |

① ↓

| LOCAL SERVER | - receiving of: (A)<br>- processing:<br>    - acceptance of (A)<br>    - advertising coding<br>    - await competitor code identification<br>- transmissions of: (B) to (D)    yes if (C) is correct →<br>                                     no if (C) is incorrect | /B |

② ↑      ③ ↓

| COMPETITOR TERMINAL | - processing<br>    - start connection<br>    - enter competitor<br>      identification code<br>- transmission of: (C) to (B) → /C | - receiving of: (B)<br>- processing:<br>    - acceptance of (B)<br>    - initialize competitor<br>      terminal<br>- await game/race phase /D |

TABLE III
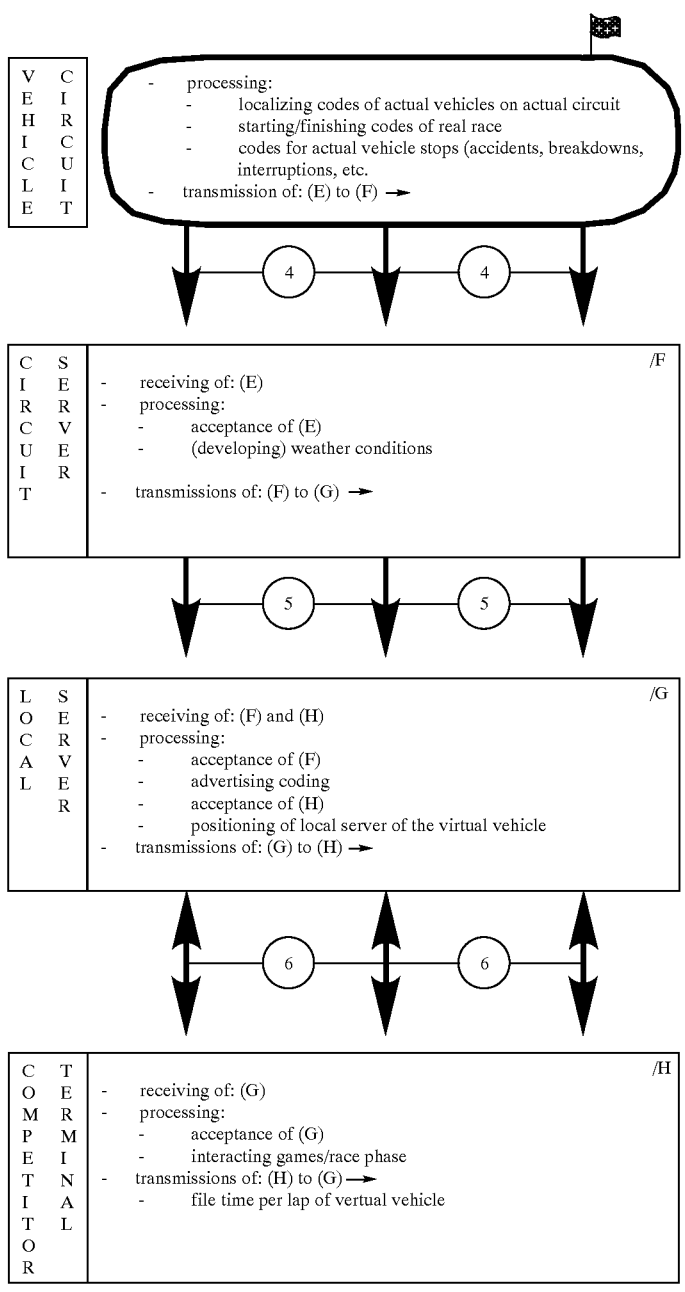

TABLE IV

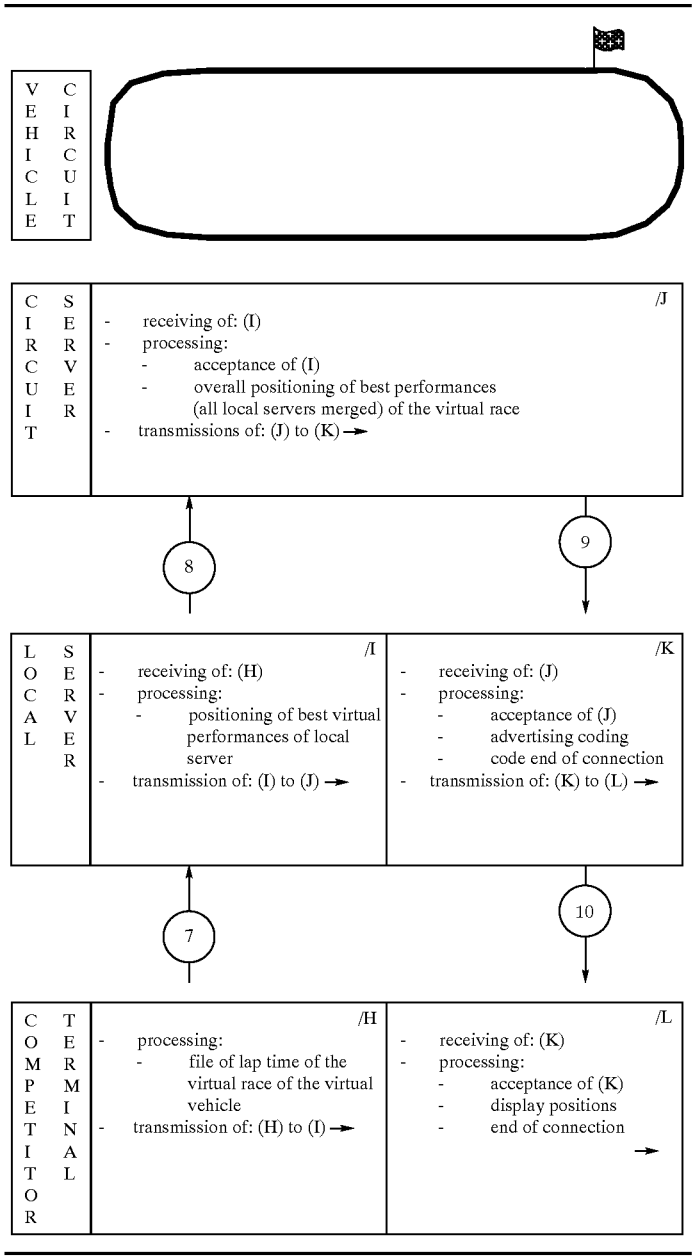

The local server device 22, 23 or 24 carries out the second operation B which involves:
  receiving the data A transmitted by operation 1,
  processing said data for:
    accepting the data A,
    introducing the advertising coding,
    awaiting the identification code of the competitor terminal.
The third operation, identified by C, is carried out at the competitor terminal 28,, 29 or 30 and comprises the following steps:
  connecting the terminal,
  entering the identification code of the competitor,
  transmitting the identification code of the competitor from C to B via the transmission 2.

The local server device 22, 23 or 24 then carries out the operation which involves:
  receiving the identification code of the terminal,
  controlling the identification code of the competitor,
  and transmitting to the terminal devices 28, 29 and 30 the initializing data if the identification code is recognized.
The transmission of this data is carried out by operation 3 and the data transmitted corresponds to (A+B).
The terminal device 28, 29 or 30 then carries out operation D which involves:
  receiving the data (A+B),
  processing the data received to:
    accept it,
    initialize the competitor terminal,
    await the start of the actual race.

Table III relates to the actual race itself which commences with operation E which involves, by means of the computer 38 and the connections 20 to 40:

obtaining the following data by data processing:
the localization codes of the actual vehicles on the actual circuit,
the starting/finishing codes of the actual race,
the codes for actual vehicle stops as a result of breakdowns, accidents, interruptions, etc., transmitting the codes defined above to the circuit server 21 in operation 4.

These data E are received by the circuit server device 21 which carries out operation F which involves:

receiving the data E,
processing it to:
accept said data,
introduce the relative codes, in particular with regard to the developing weather conditions at the actual circuit,
transmit all the data to the local server devices 22, 23 and 24 in operation 5.

Each local server device 22, 23 or 24 carries out operation G which involves:

receiving the data F,
processing said data to:
accept said data,
here introducing an advertising coding.
transmitting all the data to the terminal devices of the competitors 28, 29 and 30, regarding the local server device 23, in operation 6.

Each terminal device carries out the operation H which involves:

receiving the data G,
processing said data to:
accept said data,
start the race phase of the virtual vehicle,
measure the duration of each circuit lap of the virtual vehicle,
create a file for the time for each virtual vehicle,
transmit after each lap the data of the time file to the associated local server device in operation 6.

In the local server devices, these files for the lap time are processed in the additional steps of operation G which involves:

receiving the lap-time files from operation H,
processing these to:
accept said data,
positioning the virtual vehicles of the local server device according to the lap time.

The information of the end of the actual race stops the race of the virtual vehicles and the operations according to Table IV relate to the positioning of the competitors in the race.

As and when the race takes place, operation H creates a complete file on the time per lap of the virtual race of the virtual vehicle of the competitor.

At the end of the race, these complete files are transmitted to the local server devices in operation 7, in order for there to be processed in operation I which involves:

receiving the complete files of the race of the competitors,
processing said files to place the performance of the competitors associated with the local server device,
transmit the data of the positions to the circuit server in operation 8.

In the circuit server device, operation J involves:

receiving the position data from each of the local server devices,
processing said data to:
accept said data,
determine a general positioning of the competitors in the virtual race according to their performance,
transmit the general positioning data of the competitors to the local server devices in operation 9.

In the local server device, operation K involves:

receiving the general positioning data,
processing said data to:
accept said data,
introducing an advertising coding here,
introducing a code here for the end of the connection,
transmitting the general positioning data and the additional coding to the terminal devices in operation 10.

In the competitor terminal device, operation L involves:

receiving the data obtained in operation K,
processing said data to:
accept said data,
display the general positioning,
stopping the connection.

The description of the system according to the invention, made with reference to FIG. 1 and to Tables I, II, III and IV, corresponds to relatively simple embodiment, in particular as far as the data to be treated, the volume thereof and the processing thereof, is concerned.

This is particularly true at the level of the terminal devices which may be adapted to carry out test sessions and race training, outside the championship, with variable quantities in respect of tires, motor, brakes, gear change, etc.

In the case of very advanced systems, the range of choices of programs to be used by the amateur competitor at his terminal device is very wide, and Tables V, VI and VII indicate the extent of this range in terms of "data menus" appearing on the screen of the terminal device.

Table V indicates the various new data menus which.. are available to the competitor in the case of a virtual race which is conducted according to the system and the method of the invention, while Tables VI and VII indicate the various standard data menus which are available to the competitor within the framework of a "normal" race or a game, i.e. without a connection to a live real race.

In these Tables V, VI and VII, reference numbers 51 to 74 (with the exception of reference number 70) each designate a rectangle which defines a data menu, while the letters M to Y each designate a rectangle which, as far as rectangle 54 is concerned, corresponds to the main menus of the virtual race according to the invention and which, as far as rectangle 55 is concerned, corresponds to the main menus of a normal race.

TABLE V
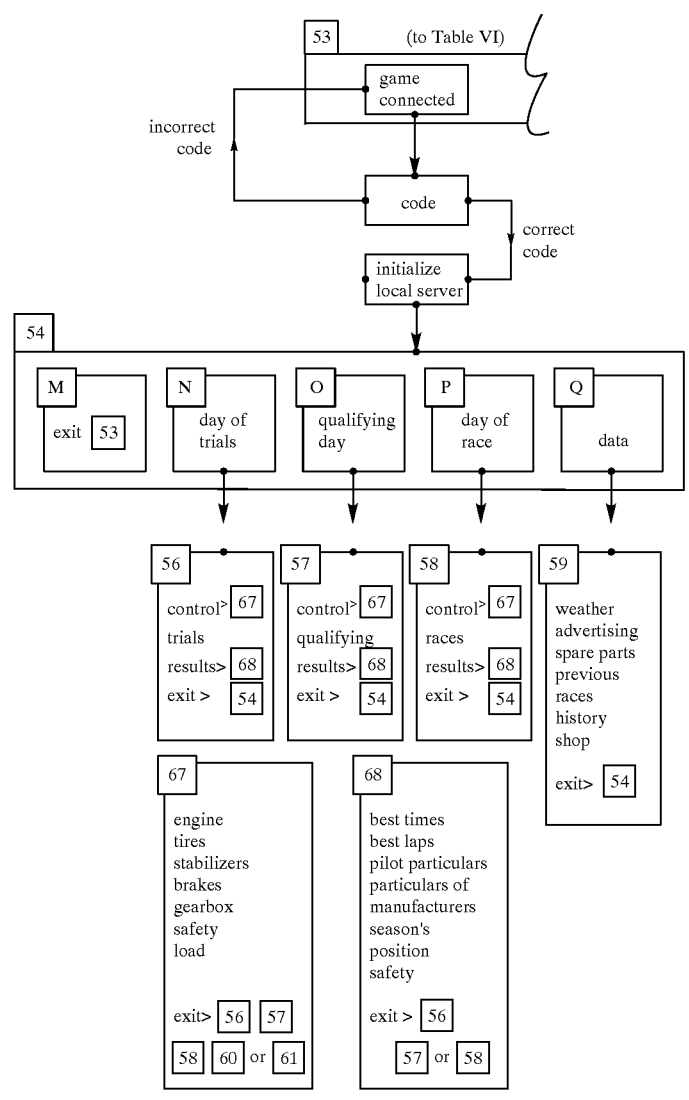

TABLE VI
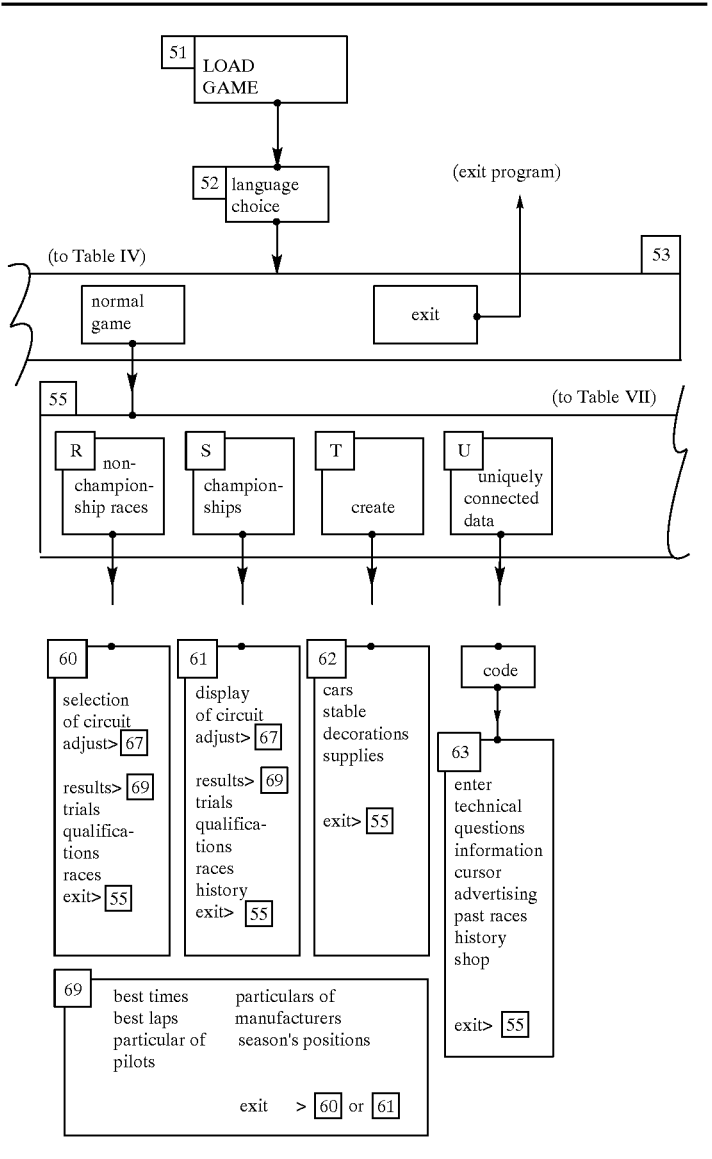

TABLE VII

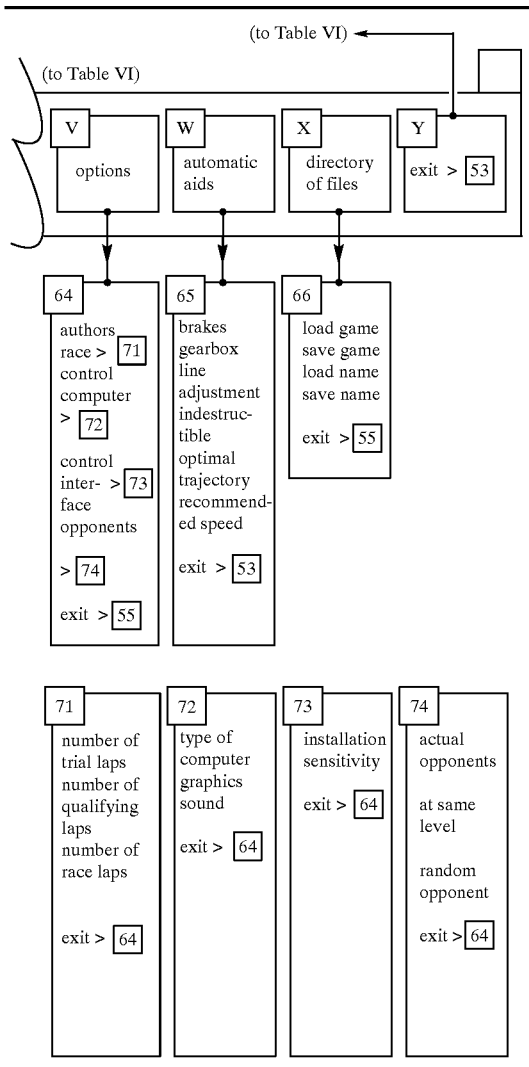

The first operation to bring the competitor terminal 28, 29 or 30 into operation is that of loading the race or the game (step 51) by means of diskettes, cartridges or compact discs, or any other data carrier. The second operation is that of selecting the language of communication (step 52). When this selection has been made, the third operation (step 53) involves selecting one of three options:

- either the game referred to as "connected", i.e. the live virtual race (Table V),
- the game referred to as "normal", i.e. the race without connection to the actual live race (Tables VI and VII),
- or to exit from the program, this option being provided in all the data menus.

In the event that the connected game (Table V) is selected, the competitor must enter his identification code into the local server device (Table II) which, if it is correct, gives him access to step 54 of the menus M, N, O, P and Q.

Menu M permits a return to step 53.

Menu N covers a day of speed trials and comprises the menu options of step 56 which permits:

- making adjustments according to the menu options of step 67,
- performing in the trials,
- establishing the results according to the menu options of step 68,
- exiting to return to step 54.

Menu O covers the day of the qualifying rounds and comprises the menu options of step 57 which permits:

- making adjustments according to the menu options of step 67,
- performing in the qualifying rounds,
- establishing the results according to the menu options of step 68,
- exiting to return to step 54.

Menu P covers the day of the race and comprises the menu options of step 58 which permits:

- making adjustments according to the menu options of step 67,
- participating in the race,
- establishing the results according to the menu options of step 68,
- exiting to return to step 54.

Menu Q is that menu which permits obtaining certain information for the race according to the menu options of step 59 which permits:

- obtaining the weather conditions,
- displaying the advertising,
- obtaining the list of spare parts available,
- obtain certain information regarding past races on the same circuit,
- obtain certain historical information regarding the race circuit under consideration,
- obtaining the list of available fittings,
- exiting to return to step 54.

The adjustments of the menu in step 67 concern the engine, the tires, stabilizers, brakes, gearbox, safety measures, and the registering of the dial readings. The exit option permits a return to steps 56, 57, 58 of Table V or to steps 60 and 61 of Table VI.

The results of the menu in step 68 relate to the best time, the best laps, the particulars of the pilots, the particulars of the manufacturers, the placings in various seasons, saving of the results, and exit to steps 56, 57 and 58 of Table V.

When selecting the normal game, i.e. without the actual race, step 55 permits a choice from the menus R to Y of Tables VI and VII, each menu R to X permitting the menu options of the respective steps 60 to 66, menu Y corresponding to a return to step 53.

These -menus 60 to 66 may lead to "sub-menus" 69 and 71 to 74 of Tables VI and VII.

These options R to Y and these menus 60 to 74 (excluding 70) are explained adequately in Tables VI and VII and do not require further detailed explanation in this context.

The electronic race system described above entails a method which comprises the following steps:

- real-time evaluation of the positions of the actual vehicles piloted by professional competitors, on the circuit 19, and their performance during the race,
- real-time evaluation of the positions of the virtual vehicles piloted by amateur competitors on the same circuit 19 in virtual reality and their performance during the race,
- simultaneous start and finish of the race of the actual vehicles and of the virtual vehicles, and
- comparison of the performance of the virtual vehicles at the end of the race in a manner so as to determine a first position between the amateur competitors of the virtual vehicles and a second position between the amateur competitors of the virtual vehicles and the professional pilots of the actual vehicles.

The various operations set out above correspond to a real-time championship race. With the system, it is, however, possible, at the level of each terminal device, to provide race formats outside the championship on any circuit desired and under conditions in which the vehicle and the weather conditions are adjusted as defined by the competitor. In addition, the method thus comprises the following operations:

storing in a permanent memory of each terminal device 28, 29 and 30 all the race data corresponding to at least one circuit 19, selection by the amateur pilot of the virtual vehicle of the operating conditions of his vehicle and of the race for the circuit under consideration, starting by the amateur pilot of the virtual vehicle of the race for the circuit under consideration, evaluating and storing the performance of the virtual vehicle during the race on the circuit under consideration, and comparison of the performance of the virtual vehicle during the race with the performance of the same virtual vehicle for the same circuit under identical conditions or under different conditions, in a manner so as to evaluate the progress in performance.

As a result of these additional operations, it is possible for the pilot of the virtual vehicle to train himself independently. If he wishes to compete with the pilots of actual vehicles for a predetermined championship race, the method additionally involves the following steps:

storing the data of the performance of the actual vehicles which participated in a race on a circuit under consideration, and comparison of the performance of the virtual vehicle with the performance of the actual vehicle for the same race in order to determine the position of the virtual vehicle relative to the actual vehicles.

What is claimed is:

1. An electronic system for contests between professional competitors who are moving about in an actual environment, and amateur competitors located elsewhere and not in the actual location of the contest and moving about in the same environment in virtual reality, the system comprising:

sensing means to determine positions of the professional competitors in the actual environment;

a circuit server for storing all data relating to the actual environment including identification of the actual surroundings and of the professional competitors in the contest, outside conditions, such as weather conditions, a state of the actual environment, starting and finishing moments of the contest, and the positions of the professional competitors during the contest;

at least one local server connected, on the one hand, to said circuit server by a first bi-directional communication links and, on the other hand, to at least one terminal associated with an amateur competitor by second bi-directional communication links, said local server receiving data from said circuit server and for transmitting, with or without processing, to said terminal connected thereto and for, on the other hand, receiving data sourced from the terminal and transmitting, with or without processing, to said circuit server;

each terminal receiving and processing the data received from the local server to which it is connected and, on the other hand, processing the performance of the amateur competitor associated with the terminal in the course of the contest and transmitting the corresponding information to said local server.

2. A system according to claim 1, wherein the circuit server additionally comprises: means to determine data corresponding to the positions of the amateur competitors output from the local server; and means to transmit the positions to said terminal via said local server.

3. A system according to claim 2, wherein each local server comprises means to grade the best performance of amateur competitors associated with terminals that are connected to said competitors and to transmit the graded performance to said circuit server.

4. A system according to one claim 1 wherein each terminal further comprises:

means for simulating the amateur competitor associated therewith;

means to display, on the screen of the terminal, a picture of at least one actual contest environment as seen by the professional competitor; and means to process the performance of the amateur competitor and to display the picture on the screen of the terminal.

5. A system according to claim 4 wherein each terminal further comprises means to assess the performance of the amateur competitor associated therewith during the contest and to create a file for the performance of the contest which has taken place, the file being transmitted to the local server.

6. A system according to claim 1 wherein each terminal further comprises:

means to store and present a plurality of contests and the performance of professional competitors; and means to modify the conditions of the contest and to permit the amateur competitor to train in a contest of his choice, in the absence of any actual contest.

7. A system according to claim 1 wherein said local server comprises:

means to transmit, to terminals, any information which is unrelated to the contest, such as advertising.

8. A process for controlling electronic contests between professional competitors who are moving about in an actual environment, and amateur competitors located elsewhere and not in the actual location of the contest and moving about in the same environment in virtual reality, the method comprising the steps:

determining the positions of the professional competitors in the actual environment;

storing all data in a circuit server, relating to the actual environment, including—identification of the actual surroundings and of the professional competitors in the contest, outside conditions such as weather conditions, a state of the actual environment, starting and finishing moments of the contest, and the positions of the professional competitors during the contest;

connecting at least one local server, on the one hand, to said circuit server by bi-directional communication links and, on the other hand, to at least one terminal associated with an amateur competitor by second bidirectional communication links, said local server receiving data from said circuit server and for transmitting, with or without processing, to said terminal connected thereto and for, on the other hand, receiving data output from the terminal and transmitting, with or without processing, to said circuit server;

receiving and processing, at each terminal, the data received from the local server to which it is connected and, on the other hand, processing the performance of the amateur competitor associated with the terminal in the course of the contest and transmitting the corresponding information to said local server.

9. A method set forth in claim 8 together with the steps:

performing real-time evaluation of the position of the professional competitors moving about in an actual environment and their performance during the contest;

performing real-time evaluation of the position of the amateur competitors moving about in the same environment in virtual reality and of their performance during the contest;

starting and finishing the contest by the professional competitors and by the amateur competitors; and comparing the performance of the amateur competitors at the end of the contest, in a manner so as to determine a first position among the amateur competitors and a second position among the amateur competitors and the professional competitors.

10. A method according to claim 9 further comprising the steps:

permanently storing, in a memory of each terminal, all of the contest data corresponding to at least one contest;

enabling selection by the amateur competitor of the conditions of the contest;

enabling the start by the amateur competitor of the contest selected;

evaluating and storing the performance of the amateur competitor during the contest selected; and comparing the performance of the amateur competitor during the contest, to the performance of the same amateur competitor, for the same contest under identical or different conditions, in a manner so as to evaluate progress in performance.

11. A method according to claim 10, further comprising the steps:

storing the data of the performance of the professional competitors who have participated in a contest; and comparing the performance of the amateur competitor to the performance of the professional competitor for the same contest, in order to evaluate a position of the amateur competitor relative to the professional competitors.

* * * * *